(12) United States Patent
Hurson

(10) Patent No.: US 12,179,414 B2
(45) Date of Patent: Dec. 31, 2024

(54) TILE MANUFACTURING PROCESS

(71) Applicant: R-TEK MANUFACTURING LIMITED, Benburb (GB)

(72) Inventor: Niall Hurson, County Down (GB)

(73) Assignee: R-TEK MANUFACTURING LIMITED, Benburb (GB)

( * ) Notice: Subject to any disclaimer, the term of this patent is extended or adjusted under 35 U.S.C. 154(b) by 0 days.

(21) Appl. No.: 17/908,501

(22) PCT Filed: Jan. 15, 2021

(86) PCT No.: PCT/EP2021/050842
§ 371 (c)(1),
(2) Date: Aug. 31, 2022

(87) PCT Pub. No.: WO2021/175504
PCT Pub. Date: Sep. 10, 2021

(65) Prior Publication Data
US 2023/0113782 A1 Apr. 13, 2023

(30) Foreign Application Priority Data
Mar. 5, 2020 (GB) ...................................... 2003169

(51) Int. Cl.
*B32B 41/00* (2006.01)
*B29C 63/00* (2006.01)
(Continued)

(52) U.S. Cl.
CPC .......... *B29C 63/0017* (2013.01); *B29C 63/48* (2013.01); *B29C 2063/485* (2013.01);
(Continued)

(58) Field of Classification Search
CPC ................ B29C 63/0017; B29C 63/48; B29C 2063/485; B29C 2793/009;
(Continued)

(56) References Cited

U.S. PATENT DOCUMENTS 8,833,028 B2  9/2014  Whispell et al.
10,344,485 B2  7/2019  Muehlebach
(Continued)

FOREIGN PATENT DOCUMENTS

WO  WO-2013117653 A2 *  8/2013  ......... B32B 37/1027

OTHER PUBLICATIONS

International Search Report and Written Opinion for related PCT application PCT/EP2021/050842, mailed Apr. 7, 2021. 10 Pages.

*Primary Examiner* — Michael N Orlando
*Assistant Examiner* — Joshel Rivera
(74) *Attorney, Agent, or Firm* — Haynes and Boone, LLP

(57) ABSTRACT

The invention provides a process of producing an interconnecting multi-layered LVT tile for a modular flooring system, the process comprising the steps of: a) forming a base substrate of plastics material with at least one locating guide by injection moulding; b) coating the back of an LVT surface layer with adhesive; c) aligning the LVT surface layer to a top surface of the base substrate such that the LVT surface layer abuts the or each locating guide of the base substrate; d) press rolling the base substrate and LVT surface layer together to form an oversized blank; and e) punching out an interlock shape from the oversized blank using a punch and die tool.

10 Claims, 4 Drawing Sheets

(51) Int. Cl.
*B29C 63/48* (2006.01)
*B29K 21/00* (2006.01)
*B29L 7/00* (2006.01)
*B29L 9/00* (2006.01)

(52) U.S. Cl.
CPC .. *B29C 2793/009* (2013.01); *B29K 2021/003* (2013.01); *B29L 2007/002* (2013.01); *B29L 2009/00* (2013.01)

(58) Field of Classification Search
CPC ......... B29K 2021/003; B29L 2007/002; B29L 2009/00; B32B 3/30; B32B 7/12; B32B 2471/00; B32B 3/06; B32B 27/08; B32B 27/304; B32B 2038/042; B32B 2274/00; B32B 37/12; B32B 38/04; B32B 37/1207; B32B 27/30; B32B 37/10; B32B 38/1833; B32B 2037/109; B32B 2037/1215; B32B 2309/105; E04F 15/105; E04F 15/107; C09J 175/04
USPC .................... 156/60, 64, 350, 351, 378, 379
See application file for complete search history.

(56) References Cited

U.S. PATENT DOCUMENTS

| | | |
|---|---|---|
| 2007/0275207 A1 | 11/2007 | Higgins et al. |
| 2009/0031662 A1 | 2/2009 | Chen et al. |
| 2011/0167744 A1* | 7/2011 | Whispell ........... E04F 15/02005 52/309.1 |

* cited by examiner

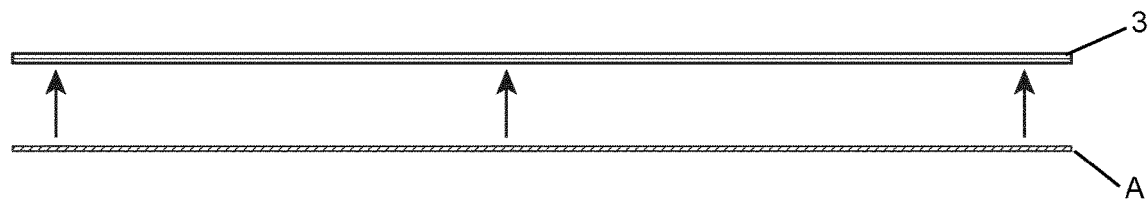
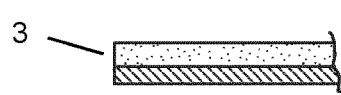 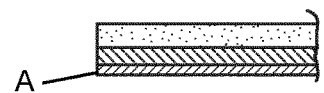
Figure 4a
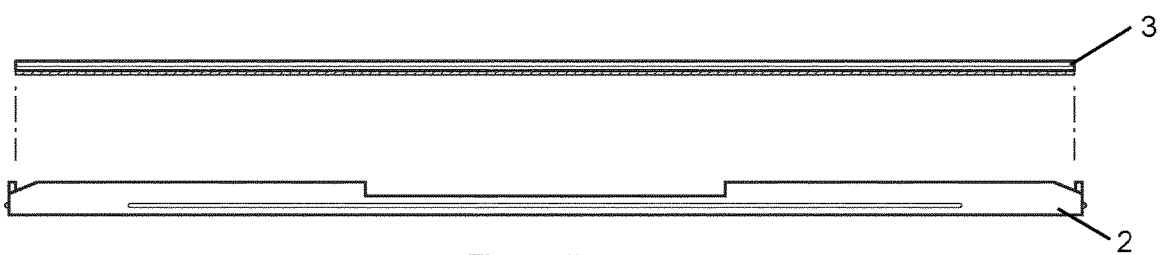
Figure 4b
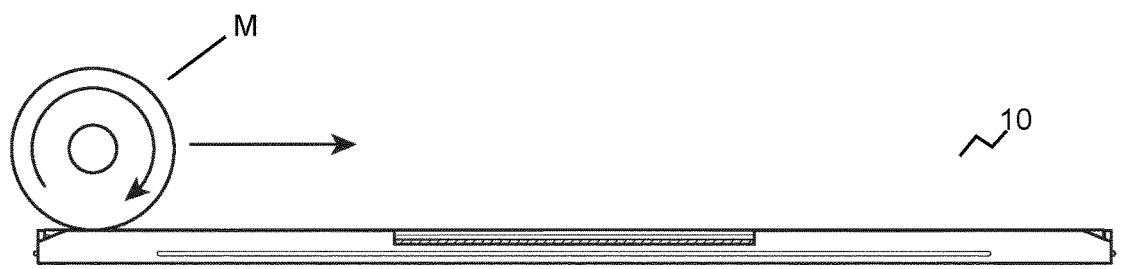
Figure 4c
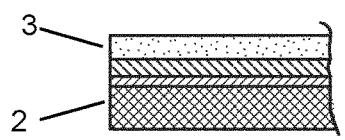

TILE MANUFACTURING PROCESS

The present invention relates to the field of floor covering manufacture, in particular to a process for producing an interconnecting tile for a modular flooring system, e.g. an interlocking multi-layered LVT tile.

BACKGROUND TO THE INVENTION

The art of manufacturing floor coverings from plastic materials to look like wood, ceramic or stone is well known. For example, luxury vinyl flooring (LVT) involves heterogeneous polyvinylchloride (PVC) tiles made with a series of layers. A stability layer helps the product to lay flat and level, a high-density vinyl layer provides protection and impact resistance, a decorative layer gives the product its realistic wood, ceramic or stone effect and a wear layer protects the floor's design from wear and tear. The layers are superimposed and combined using heat and pressure.

There are various known floor coverings which can be constructed from elements that can be connected mechanically to one another. The elements are often panels which comprise a rectangular area and which have, along their periphery, i.e. at their periphery, connection means for connection to the adjacent panels. U.S. Pat. No. 10,344,485 discloses a floor element having at least two layers of cork-based material and having a click-lock connection, i.e. a connection in which a floor element is firstly longitudinally clicked at an angle into a previously laid floor element, and is then tilted into the horizontal position. The floor element also has connection means along the shorter sides which permit vertical insertion of adjacent floor elements. This allows a floor element to be inserted vertically downward along the shorter side into a previously laid floor element.

Other interlocking floor coverings typically have alternating projecting tongues and notches, on their peripheral edges, for example dovetail connections. Interlocking laminate and LVT floor coverings currently on the market with such dovetail connections are prepared by co-extrusion and a hot press process.

It is an object of the present invention to provide a new, improved process of producing an interlocking LVT floor covering for a modular flooring system, the process being quicker, cheaper, more efficient and convenient than has previously been achievable.

SUMMARY OF THE INVENTION

The present invention relates to a process of producing an interconnecting LVT floor covering such as interlocking multi-layered LVT tiles for a modular flooring system, using injection moulding.

Accordingly, a first aspect of the present invention provides a process of producing an interconnecting multi-layered LVT tile for a modular flooring system, the process comprising the steps of:
a) forming a base substrate of plastics material with at least one locating guide by injection moulding;
b) coating the back of an LVT surface layer with adhesive;
c) aligning the LVT surface layer to a top surface of the base substrate such that the LVT surface layer abuts the or each locating guide of the base substrate;
d) press rolling the base substrate and LVT surface layer together to form an oversized blank; and
e) punching out an interlock shape from the oversized blank using a punch and die tool.

The locating guide is for aligning the LVT surface layer on the top surface of the base substrate.

The locating guide is preferably an upstanding section at a portion of the perimeter of a top surface of the base substrate, particularly preferably at one or more corners thereof.

The locating guide may be continuous or discontinuous. That is, it may be a solid upstanding wall or it may alternatively comprise multiple upstanding columns beside each other.

The base substrate is preferably four-sided, e.g. square, preferably having locating guides at two adjacent corners.

Preferably the plastics material is a thermoplastic elastomer. Alternatively, the plastics material is formed of PVC, particularly preferably recycled PVC, although other plastics materials which impart a necessary impact resistance may be used.

Suitable LVT surface layers have at least one PVC layer, a print layer and a wear layer based on any one or more of melamine resin, polyurethane, polyethylene terephthalate, polypropylene and PVC.

In a preferred embodiment, the adhesive used in step b) is hot melt polyurethane adhesive. However, this is not to be considered limiting and suitable alternatives may be used.

A roller coater machine is preferably used to apply the adhesive to the LVT surface layer in step b).

In a preferred embodiment, the press rolling in step d) is achieved using a nip-roller machine The floor covering is of a thickness sufficient to impart the floor covering with the necessary bend strength and impact resistance, preferably wherein the floor covering thickness is in the range of about 6 mm to about 10 mm thick, preferably about 6.5 mm to about 9.5 mm thick, e.g. 7.5 mm thick.

The interlock shape preferably comprises a plurality of protruding tongues and grooves at adjacent sides of the base substrate, particularly preferably a dovetail connection.

In a preferred embodiment, the base substrate is in the range of from about 3 mm to about 8 mm thick, preferably from about 4 mm to about 7 mm, e.g. about 5 mm thick.

In a preferred embodiment, the LVT surface layer is in the range from about 2 mm to about 3 mm thick, e.g. about 2.5 mm thick.

BRIEF DESCRIPTION OF THE DRAWINGS

Certain preferred embodiments of the present invention will now be described, by way of example only, with reference to the accompanying drawings in which:

FIGS. 4A to 4C show a schematic view of a preferred process according to the invention, including enlarged sections of the respective side views.

DETAILED DESCRIPTION

Figure 1A:
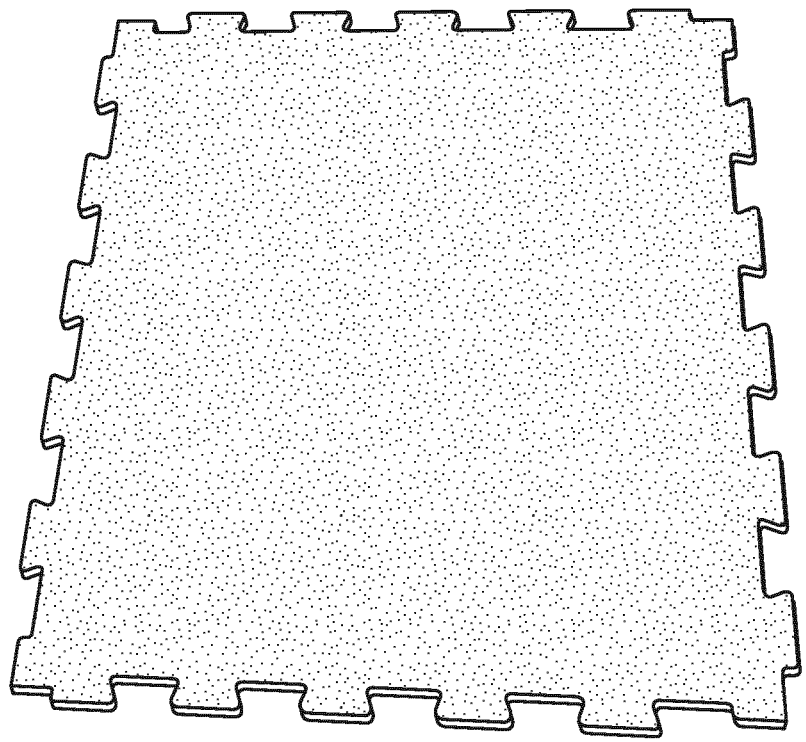
FIG. 1A shows a perspective view of a prior art tile formed by co-extrusion, not layering.
Figure 1B:
FIG. 1B shows a side view of the prior art of FIG. 1A.

Various embodiments of the present invention will be described in detail with reference to the drawings, where like reference numerals represent like parts and assemblies throughout the several views.

Figure 2A:
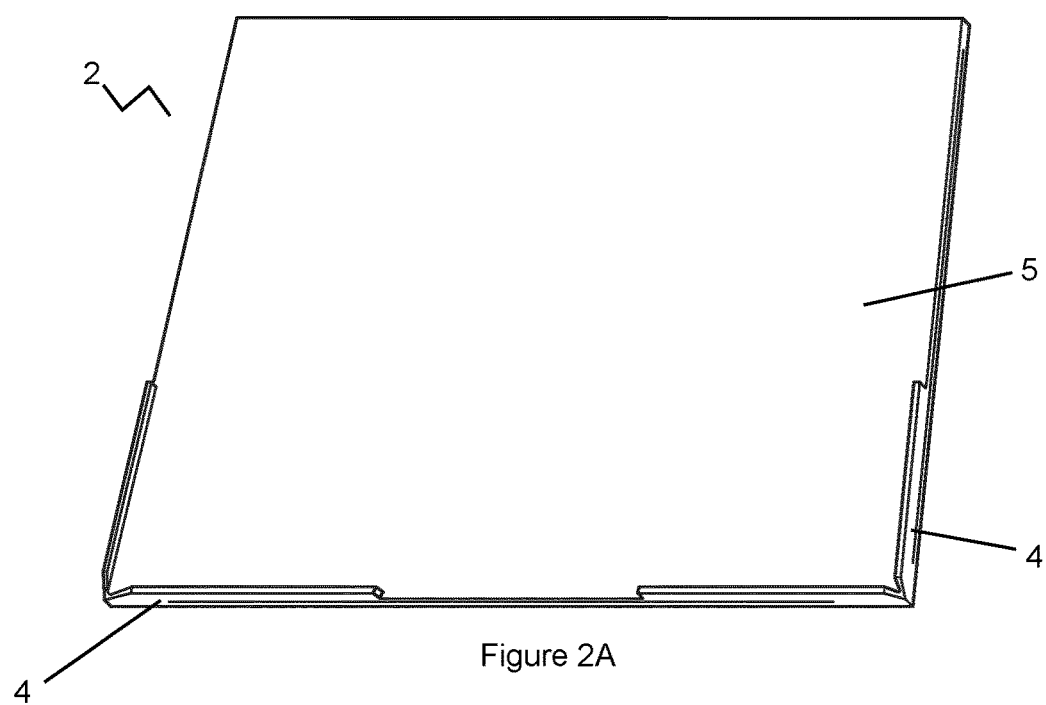
FIG. 2A shows a perspective view of a preferred base substrate used in the process according to the invention.
Figure 2B:
FIG. 2B shows a side view of the base substrate of FIG. 2A.
Figure 2C:
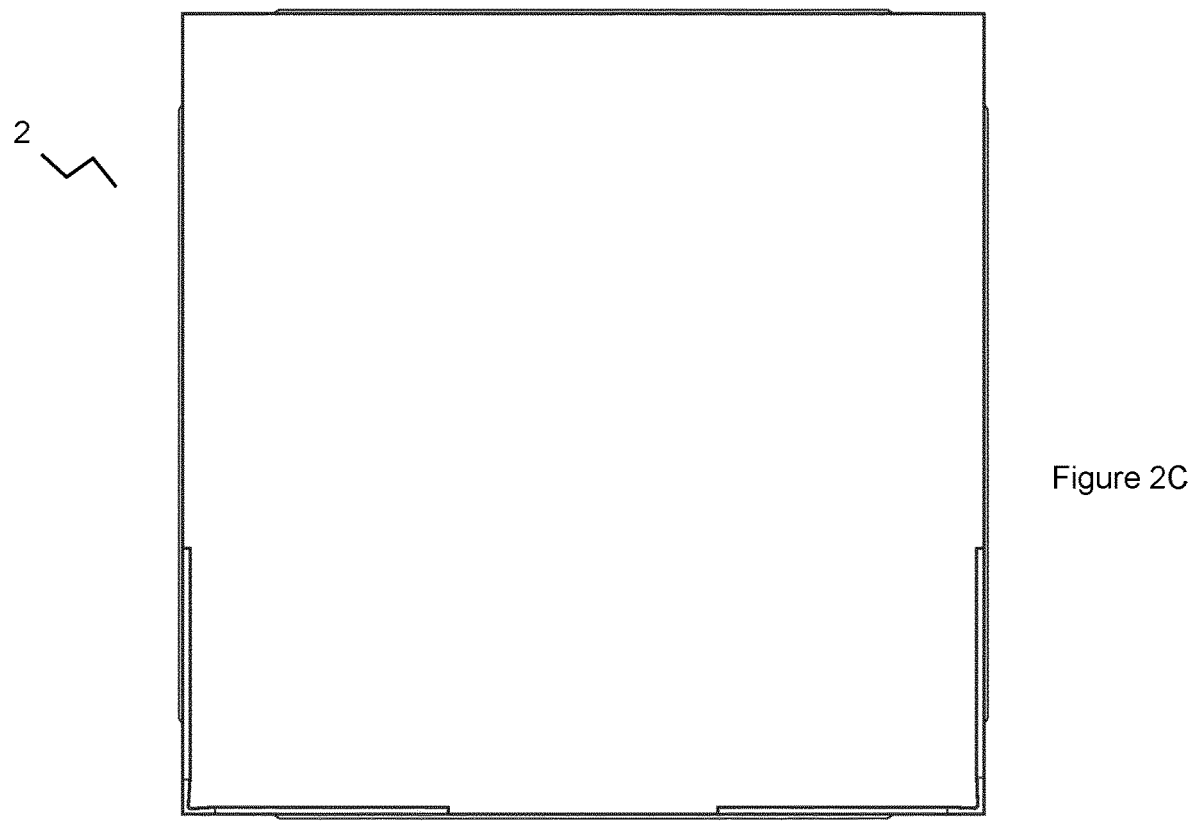
FIG. 2C shows a plan of the base substrate of FIGS. 2A and 2B.

Referring to the drawings, a preferred process of forming an interlocking tile is described, the process comprising the initial step of forming a base substrate 2 having upstanding locating guides 4 at two corners of the top surface 5 of the substrate 2. This preferred base substrate 2 is shown in FIGS. 2A to 2C.

An injection moulding tool may be fitted to an injection moulding machine and appropriately operated to form base substrate 2. Base substrate 2 is removed from the machine when formed and allowed to cool. Such an injection moulding tool is fitted to the machine between the machine plates and secured using mould clamps. Flexible PVC in any of various colours is then vacuum fed to a hopper of the moulding machine and gravity feed into a barrel of the machine where it is melted at between 180-190° C. The injection moulding machine is set to allow a screw inside the barrel to pick up sufficient melted material that is then injected through a nozzle of the barrel and into the closed mould at pre-set speeds and pressures. The mould remains closed for a pre-set time to allow cooling. The mould then opens and base substrate 2 with upstanding locating guides 4 is manually or automatically ejected from the mould. This moulded base substrate 2 is then stacked on cooling racks for about 24 hours. It will be understood that the dimensions for base substrate 2 and locating guide 4 may be moulded as required or as desired.

Next, as shown schematically in FIG. 4A, an adhesive A is applied to a bottom surface of an LVT surface layer 3. Such a step may be performed by operating a roller coater machine (not shown) to apply adhesive A to LVT surface layer 3. Adhesive A may be a hot melt polyurethane adhesive or any other suitable adhesive and LVT surface layer 3 may comprise a PVC backing layer, a printed middle layer having a desired surface finish or effect for the tile, such as stone, ceramic, wood, etc, and a clear PVC top layer. LVT surface layer 3 is sized as appropriate to sit against locating guides 4 on the substrate.

Figure 3:
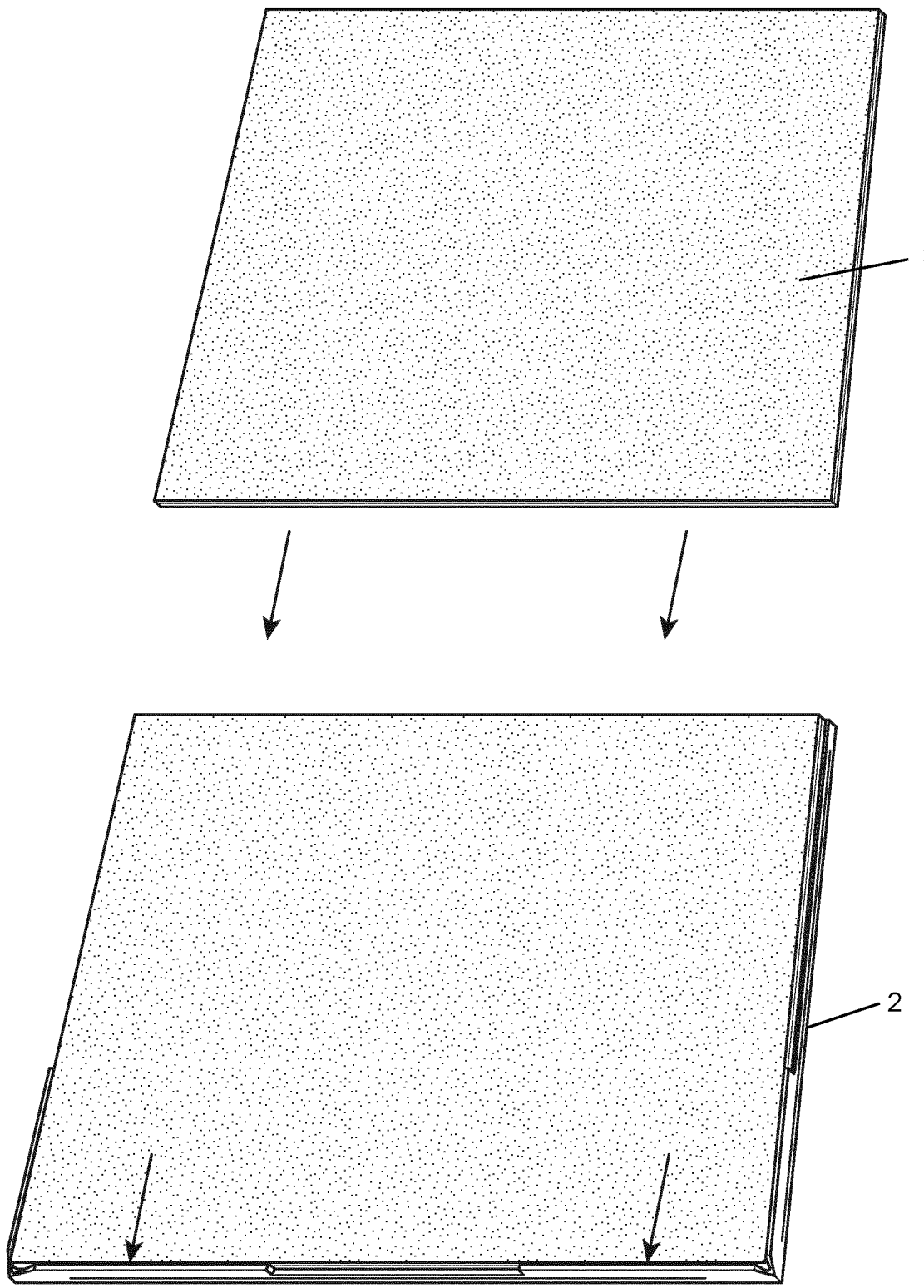
FIG. 3 shows a schematic perspective view of a preferred blank formed in the process according to the invention.

As shown in FIGS. 3 and 4B, LVT surface layer 3 is then oriented as required and placed onto base substrate 2 and aligned within locating guides 4 so that the back of LVT surface layer 3 sits on top surface 5 of base substrate 2. As shown in FIG. 4C, pressure is then applied to LVT surface layer 3 on base substrate 2, such as by operating a nip-roller machine M, so that LVT surface layer 3 is bonded to base substrate 2 to form oversized blank 10. Blanks 10 are then stacked flat on a cooling rack (not shown) for a further 24 hours.

Oversized blanks 10 are then passed onto the surface of a die (not shown). An operator powers a punch (not shown) and the flattened surface of the tapered punch cutting ridge contacts the edge of oversized blank 10 and shears off the oversized portion leaving an interlocking tile conforming to the dimensional requirements. The action of the punch head presses the exact size tile into the cavity of the die to a position where the punched tile supports the subsequent oversized blank 10 as it is located onto the die. Advantageously, the die has an open bottom where the already punched tile falls through onto a removal conveyor belt when the overlying oversized blank 10 is punched.

It is to be understood that the invention is not limited to the specific details described herein which are given by way of example only and that various modifications and alterations are possible without departing from the scope of the invention as defined in the appended claims.

The invention claimed is:

1. A process of producing an interconnecting multi-layered luxury vinyl flooring tile (LVT) for a modular flooring system, comprising:
    forming a base substrate of plastics material with at least one locating guide by injection molding;
    coating the back of an LVT surface layer with adhesive;
    aligning the LVT surface layer to a top surface of the base substrate such that the LVT surface layer abuts the or each locating guide of the base substrate;
    press rolling the base substrate and LVT surface layer together to form an oversized blank;
    passing the oversized blank onto the surface of the die of a punch and die tool; and
    shearing off the edge of the oversized blank with the punch, to produce an interlock shape from the oversized blank.

2. The process of claim 1, wherein the at least one locating guide is an upstanding section at a portion of the perimeter of a top surface of the base substrate.

3. The process of claim 1, wherein the at least one locating guide is a solid upstanding wall.

4. The process of claim 1, wherein the base substrate is four-sided.

5. The process of claim 1, wherein the plastics material is a thermoplastic elastomer.

6. The process of claim 1, wherein the adhesive is a hot melt polyurethane adhesive.

7. The process of claim 1, wherein a roller coater machine is used to apply the adhesive to the LVT surface layer.

8. The process of claim 1, wherein the press rolling is achieved using a nip-roller machine.

9. The process of claim 1, wherein the interlock shape comprises a plurality of protruding tongues and grooves at adjacent sides of the base substrate.

10. The process of claim 1, wherein the base substrate is in the range of from about 3 mm to about 8 mm thick.

* * * * *